US010527089B2

(12) United States Patent
Winter et al.

(10) Patent No.: US 10,527,089 B2
(45) Date of Patent: Jan. 7, 2020

(54) DIRECTIONAL BEARING FOR BALL JOINT

(71) Applicant: MEVOTECH LP, Toronto (CA)

(72) Inventors: Simon Winter, Toronto (CA); Jack McVeigh, Toronto (CA); Tyler Kearns, Toronto (CA); Rosan Luiz, Toronto (CA)

(73) Assignee: MEVOTECH LP, Toronto, Ontario ( * ) Notice: Subject to any disclaimer, the term of this patent is extended or adjusted under 35 U.S.C. 154(b) by 142 days.

(21) Appl. No.: 15/338,901

(22) Filed: Oct. 31, 2016

(65) Prior Publication Data
US 2018/0119731 A1    May 3, 2018

(51) Int. Cl.
*F16C 11/06* (2006.01)

(52) U.S. Cl.
CPC ...... *F16C 11/0685* (2013.01); *F16C 11/0604* (2013.01); *F16C 11/0623* (2013.01); *F16C 2226/76* (2013.01); *F16C 2326/05* (2013.01)

(58) Field of Classification Search
CPC ..... Y10T 403/32311; Y10T 403/32631; Y10T 403/32737; Y10T 403/32786; Y10T 403/32803; F16C 11/0623; F16C 11/0638; F16C 11/0685; F16C 11/0695; F16C 2226/76; B60G 7/005; B60G 2204/416
USPC ............................ 403/90, 122, 135, 141, 143
See application file for complete search history.

(56) References Cited

U.S. PATENT DOCUMENTS

| 4,568,216 | A | * | 2/1986 | Mizusawa ........... | F16C 11/0657 403/122 |
|---|---|---|---|---|---|
| 5,573,463 | A | * | 11/1996 | Arlt .......................... | F16D 3/76 464/147 |
| 6,736,565 | B2 | | 5/2004 | Tamatsu et al. | |
| 6,739,788 | B1 | | 5/2004 | Hagemes et al. | |
| 7,083,356 | B2 | * | 8/2006 | Paduano ............. | F16C 11/0604 403/122 |
| 8,353,776 | B2 | | 1/2013 | Zhang et al. | |
| 8,770,882 | B2 | * | 7/2014 | Ersoy .................. | F16C 11/0604 403/114 |
| 8,851,785 | B1 | | 10/2014 | Belleau et al. | |
| 8,864,155 | B2 | | 10/2014 | Kurota | |
| 9,841,051 | B2 | * | 12/2017 | Graben ............... | F16C 11/0638 |
| 2006/0193681 | A1 | * | 8/2006 | Holierhoek ......... | F16C 11/0638 403/122 |

FOREIGN PATENT DOCUMENTS

JP          4145739 B2 *  9/2008   .......... F16C 11/0652

* cited by examiner

*Primary Examiner* — Jonathan P Masinick
(74) *Attorney, Agent, or Firm* — Lorelei G. Graham

(57) ABSTRACT

A ball joint having alignment guides to ensure correct assembly of a directional bearing into the internal chamber of a housing, the directional bearing having an elliptical external surface engaging a mating elliptical alignment surface of the internal chamber such that the ball end of the ball joint stud is pivotally mounted for angular motion within a major swing plane and a minor swing plane relative to the housing axis.

3 Claims, 5 Drawing Sheets

DIRECTIONAL BEARING FOR BALL JOINT

TECHNICAL FIELD

The invention relates to a directional bearing for a ball joint, used in an automotive suspension system, steering system or the like, having a major and a minor swing planes, where the bearing and housing include matching alignment features to ensure that the major and minor swing planes of the bearing are accurately assembled in the housing, and that the housing is accurately assembled to an associated automotive component.

BACKGROUND OF THE ART

Ball joints allow pivoting movement of automotive suspension or steering components relative to each other while retaining the capacity to transmit axial and shear forces thereby accommodating wheel movement, steering movement, stability and wheel alignment.

Ball joints typically include a stud with a shank that is threaded at one end for releasably connecting to an adjacent component. Other means of connecting the stud and component are also used. The stud has a spherical ball at the opposite end mounted within spherical bearings or retainer ring housed in a ball joint housing. The ball stud is retained in the ball joint housing extending through a central opening in the directional bearing or retainer ring.

To accommodate an asymmetric range of motion in some components, the swing angle of the ball stud relative to the housing axis is not uniform in all directions in directional ball joints but is asymmetric with a swing angle that varies and must be accommodated by an elliptical opening in the bearing or retainer ring to allow free movement of the ball stud. Directional bearings include a spherical interior surface and allow a greater swing angle in predetermined directions. The central opening of the directional bearing is wider and narrower to allow the longitudinal stud axis to move freely within a major swing plane through the housing axis in a range of ±angle α relative to the housing axis and a minor swing plane through the housing axis in a range of ±angle β relative to the housing axis, where α is greater than β. An example is described in U.S. Pat. No. 8,851,785 which includes a retainer ring with an elliptical opening having major and minor axes.

It is critical to align the major and minor swing plane of the directional ball joint with the correct planes of motion through which an associated automotive component moves. Misalignment results in the restriction of the ball stud motion by interference with the edges of the opening through which the ball stud projects. Failure of the ball stud or bearing can result from such interference.

Correct alignment of the ball joint major and minor swing planes with the associated automotive component into which it is installed is controlled through proper training during manufacture and instructions to mechanics in the installation information provided. However errors can occur and incorrect alignment can result in catastrophic failure of ball studs in automotive suspension, stabilization, and steering systems.

Features that distinguish the present invention from the background art will be apparent from review of the disclosure, drawings and description of the invention presented below.

DISCLOSURE OF THE INVENTION

The invention provides a ball joint having alignment guides to ensure correct assembly of a housing and a directional bearing, the ball joint comprising: a housing having an internal chamber having a bearing seat with a first alignment guide and an open end, the housing and open end having a housing axis; a ball stud having a longitudinal stud axis, a spherical ball end within the housing and a shank extending axially out of an open end of the housing; a directional bearing having an external surface engaging the bearing seat, the external surface having a second alignment guide mating with the first alignment guide, and an internal spherical surface within which the ball end is pivotally mounted for angular motion of the longitudinal stud axis within a major swing plane through the housing axis in a range of ±angle α relative to the housing axis and a minor swing plane through the housing axis in a range of ±angle β, relative to the housing axis, where α is greater than β.

DESCRIPTION OF THE DRAWINGS

In order that the invention may be readily understood, one embodiment of the invention is illustrated by way of examples in the accompanying drawings.

Further details of the invention and its advantages will be apparent from the detailed description included below.

DETAILED DESCRIPTION OF PREFERRED EMBODIMENTS

Figure 1:
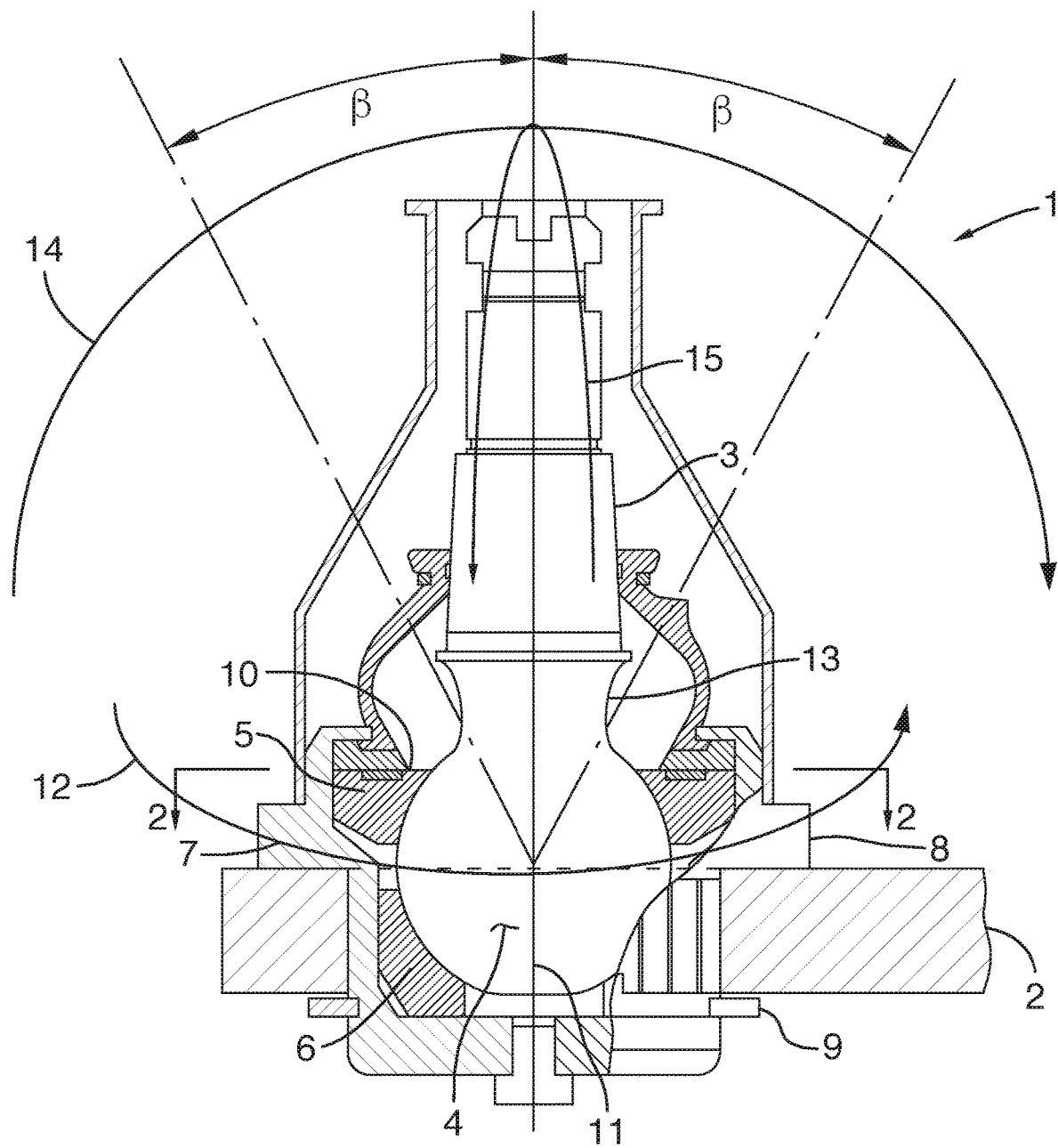
FIG. 1 is an axial sectional view through an example prior art ball joint having a ball stud with a spherical ball end and a shank extending axially out of an open end of the housing mounted in a directional bearing for angular motion within a major swing plane and a minor swing plane through and relative to the housing axis.

FIG. 1 shows an axial sectional view through a prior art example of a directional ball joint 1 mounted into an opening through an automotive component 2, which could include a control arm, a stabilizer link, a stabilizer bar or a steering linkage. The ball stud 3 has a spherical ball end 4 mounted in spherical upper directional bearing 5 and lower non-directional bearing 6 enclosed in a cylindrical housing 7 that is press fit into the automotive component 2 and secured by a flange 8 and a spring retention ring 9.

The directional ball joint 1 has three degrees of freedom of movement indicated by arrows and rotates about the center of the ball end 4. The ball stud 3 extends through an opening 10 in the spherical upper directional bearing 5. Free rotation about the axis 11 of the ball stud 3 indicated by arrow 12 is not limited i.e: 360 degree rotation in a plane perpendicular to the axis 11.

Due to interference between the opening 10 in the spherical upper directional bearing 5 and the neck 13 of the ball stud 3, other rotational angular movements are limited. Angular motion within a minor swing plane, passing through and relative to the housing axis, is indicated by arrow 14. Angular motion within a major swing plane, orthogonal to the major swing plane, passing through and relative to the housing axis, is indicated by arrow 15.

The minor swing plane through the housing axis has a freedom of movement without interference in a range of ±angle β relative to the housing axis. The major swing plane (indicated by arrow 15) through the housing axis has a range of ±angle α (not shown) orthogonal to the minor swing plane (indicated by arrow 14) and relative to the housing axis, where α is greater than β.

Figure 2:
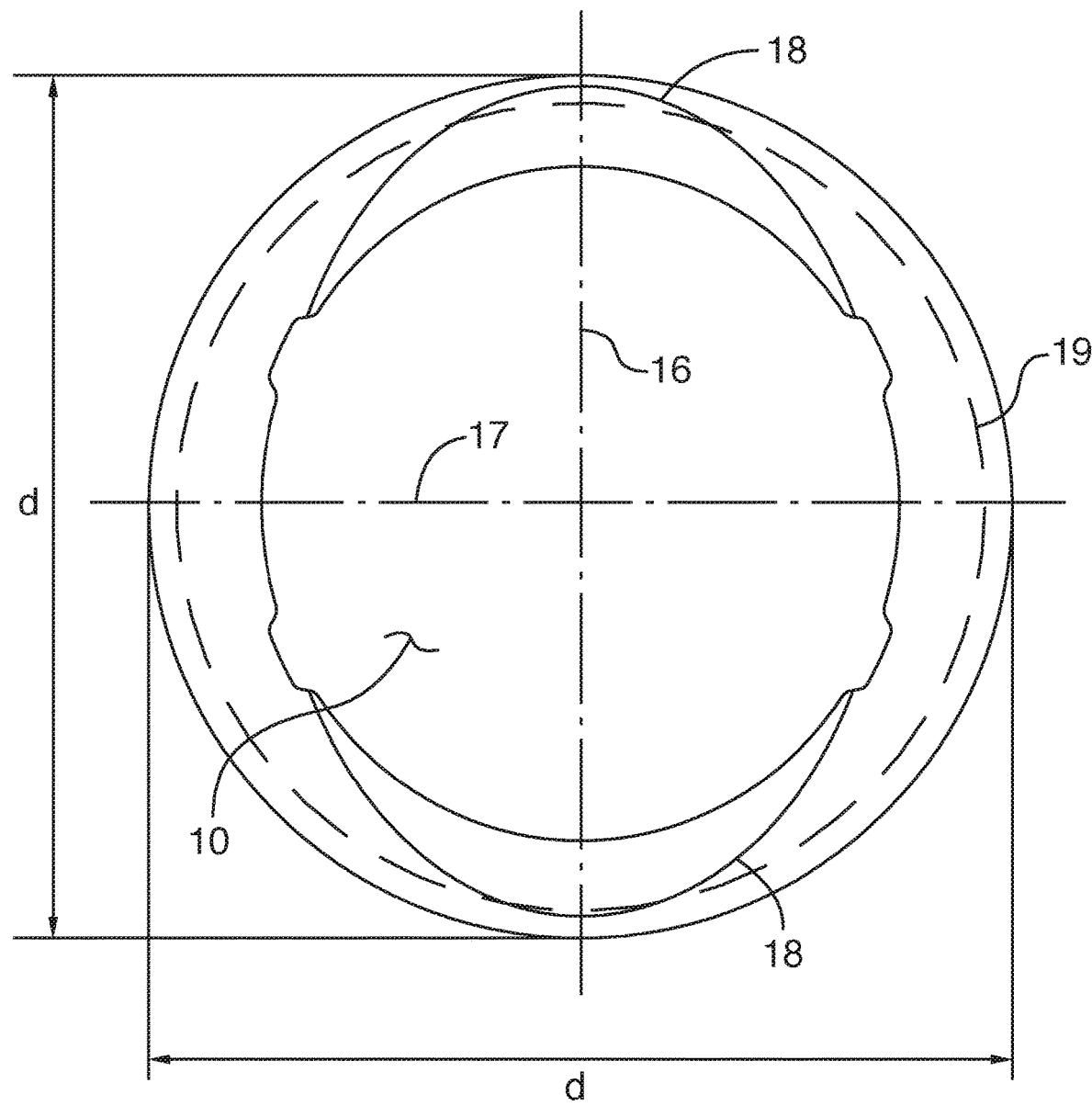
FIG. 2 is a top view along line 2-2 of FIG. 1 of a prior art directional bearing having a circular external surface and spherical internal surface with the major swing plane oriented up-down as drawn and the minor swing plane oriented left-right as drawn.

FIG. 2 shows detail along line 2-2 of FIG. 1 of a prior art directional upper bearing 5 having a circular external surface of uniform diameter "d". The directional upper bearing 5 has spherical internal surface 19 (on the underside shown in dashed outline). The major swing plane 16 is oriented up-down as drawn and the minor swing plane 17 oriented left-right as drawn. The elliptical upper edge 18 of the opening 10 allows the neck 13 to swing without interference with the edge 18 through a greater angle α along the major swing axis 16 compared to the minor swing axis 17.

Since the prior art directional upper bearing 5 has a cylindrical external surface of uniform diameter "d", the assembly of the directional upper bearing 5 into the housing 7 does not limit the alignment of the major swing axis 16 and the minor swing axis 17. Since the exterior of the housing 7 is cylindrical, alignment of the major swing axis 16 and the minor swing axis 17 to the automotive component 2 is carried out by rotating the entire assemble ball joint 1 when the housing 7 is installed in the automotive component 2. Errors occur due to lack of attention, lack of sufficient training, or because the orientation cannot be seen when the protective boot is installed.

The invention provides alignment guides that ensure proper alignment since the bearing and housing cannot be assembled otherwise.

Figure 3:
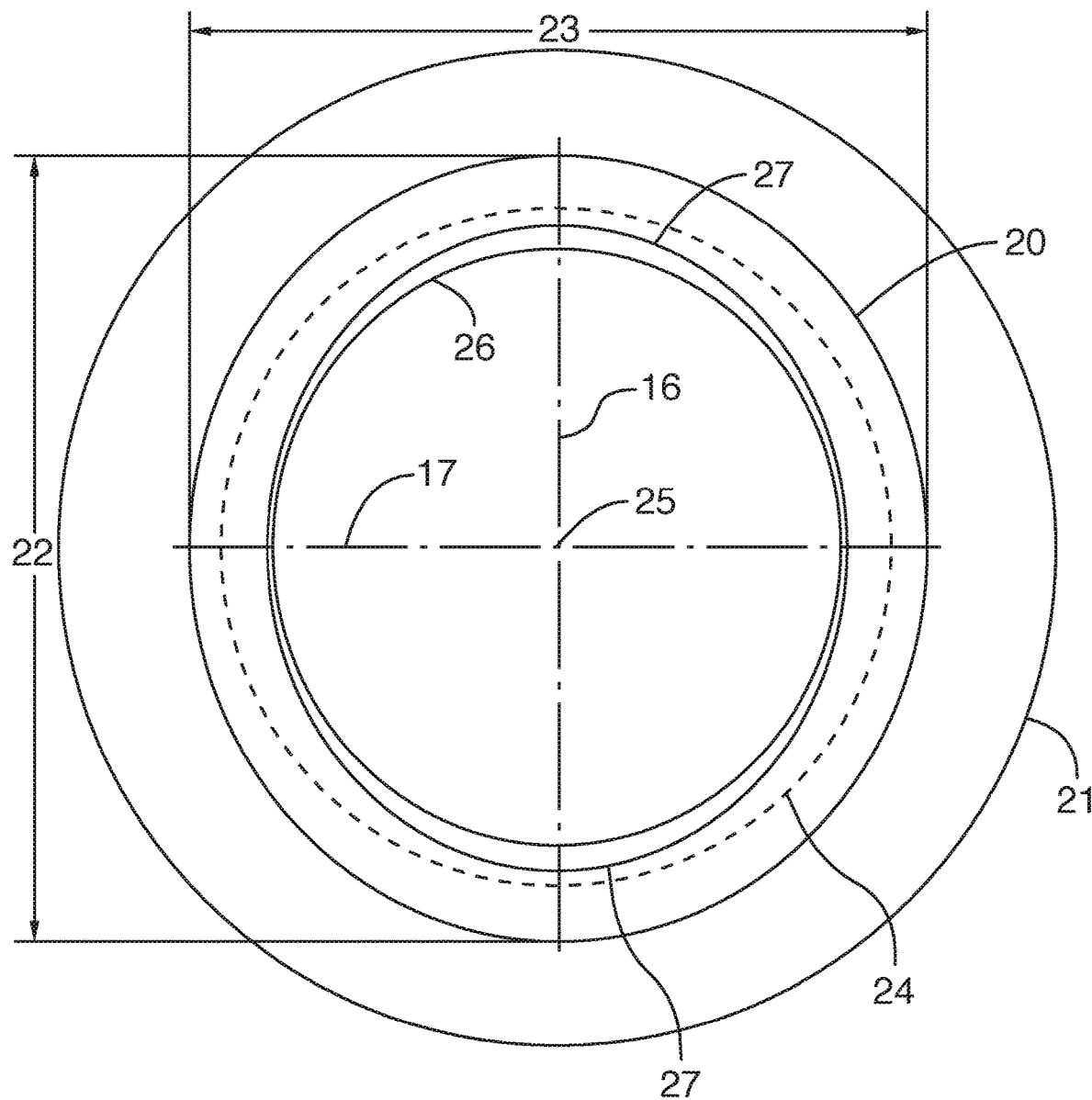
FIG. 3 is a top view of a directional bearing and housing in accordance with a first example embodiment of the invention the bearing and housing having matching elliptical contact surfaces that serve as alignment guides for assembling the bearing into the housing with major and minor planes aligned.

FIG. 3 shows a directional upper bearing 20 mounted in seating surface of an outer housing 21. The housing 21 has an elliptical internal chamber defining an elliptical bearing seat into which the elliptical exterior surface of the bearing 20 is seated. In the embodiment shown in FIG. 3 the bearing seat in the housing 21 forms a first alignment guide and the external elliptical surface of the bearing 20 forms a second alignment guide. The bearing 20 cannot be assembled to the housing 21 unless the major dimension 22 are aligned correctly.

The underside spherical surface 24 which contacts the ball end (not shown) is symmetric about the housing axis 25. The exterior surface of the bearing 20 is asymmetric about the housing axis 25 with major dimension 22 being greater than minor dimension 23. Elliptical surfaces as opposed to simple cylindrical surfaces cannot easily be machined on a simple lathe but casting or forging of elliptical surfaces and machining using computer numerical controlled milling machines is common and can be utilized to provide elliptical mating surfaces as assembly alignment guides.

The opening 26 through which the ball stud (not shown) projects has an elliptical edge 27 providing clearance for the neck (not shown) of the ball stud to swing without interference to a greater degree along the major swing plane 16 compared to the minor swing plane 17.

Stated generally the bearing 20 and housing 21 are aligned during assembly whereby the elliptical mating surfaces engage. The housing 21 having an internal chamber forming a bearing seat with a first alignment guide. The directional bearing 20 has an external surface engaging the bearing seat, where the external surface forms a second alignment guide mating with the first alignment guide. As in other directional bearings the directional bearing 20 has an internal spherical surface 24 within which the ball end is pivotally mounted for angular motion of the longitudinal stud axis within a major swing plane through the housing axis 25 in a range of ±angle α relative to the housing axis 25 and a minor swing plane through the housing axis in a range of ±angle β relative to the housing axis 25, where α is greater than β.

Figure 4:
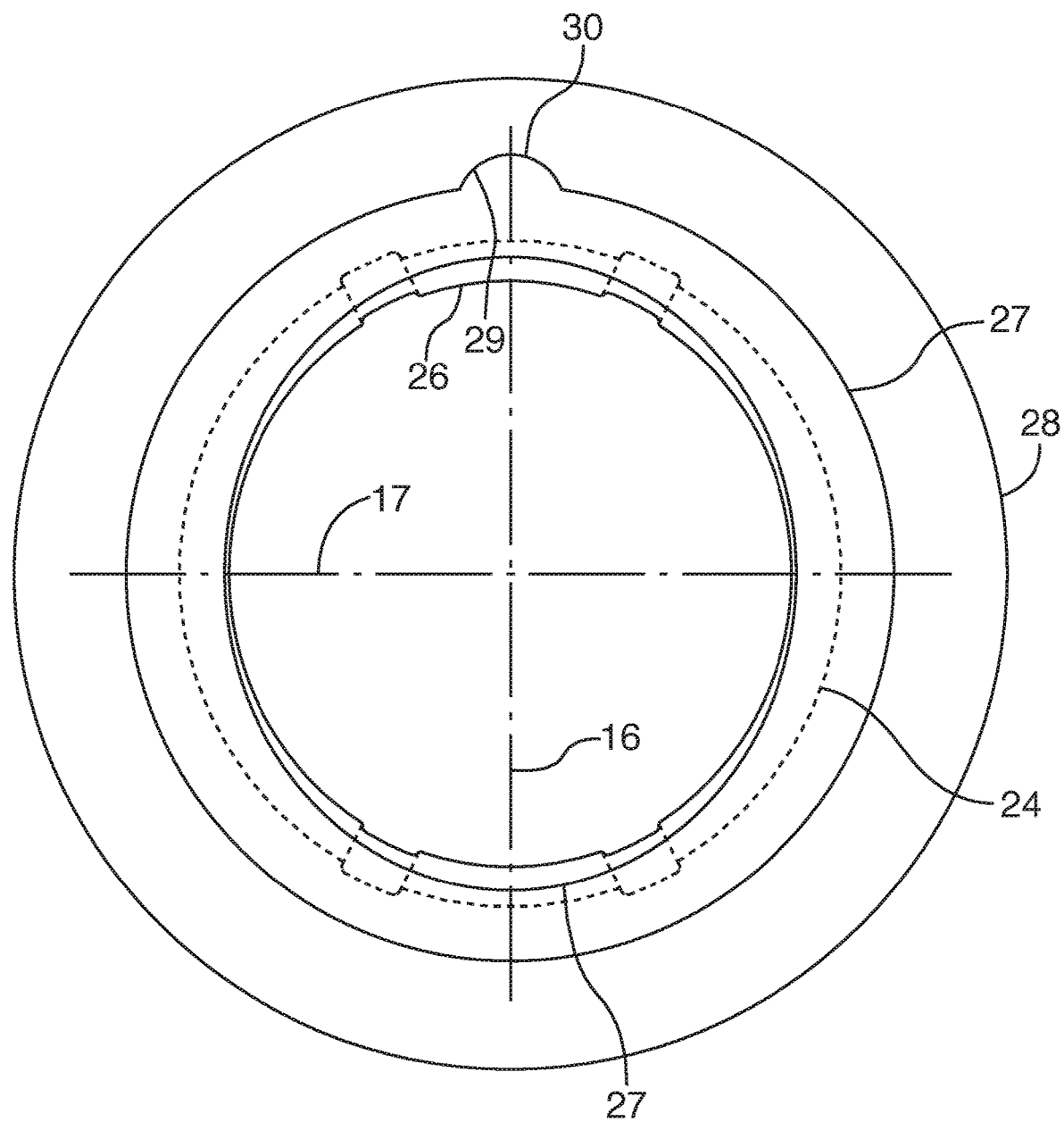
FIG. 4 is a top view of a directional bearing and housing in accordance with a second example embodiment of the invention the bearing and housing having matching protruding ridge and groove that serve as alignment guides for assembling the bearing into the housing with major and minor planes aligned.

FIG. 4 shows an alternative embodiment also having alignment guides for alignment of the bearing 27 in the housing 28. In this case the first alignment guide in the housing 28 comprises a recess 29 and the second alignment guide comprises a protrusion 30 matching the recess 29. Multiple protrusions 30 and recesses 29 could be provided or an asymmetric plurality of protrusions 30 and recesses 29 could be used to prevent the bearing 27 from being installed upside down. Assembly of the bearing 27 into the housing 28 is impossible unless the recess 29 and protrusion 30 are properly aligned. Of course the arrangement can also be reversed (not illustrated) where the second alignment guide in the bearing 27 comprises a recess and the first alignment guide comprises in the housing a protrusion matching the recess. The recess 29 could be formed as an axial groove or as a helical groove in the interior surface of the housing 28. Further the protrusion 30 could be formed as an axial ridge or a helical ridge.

Figure 5:
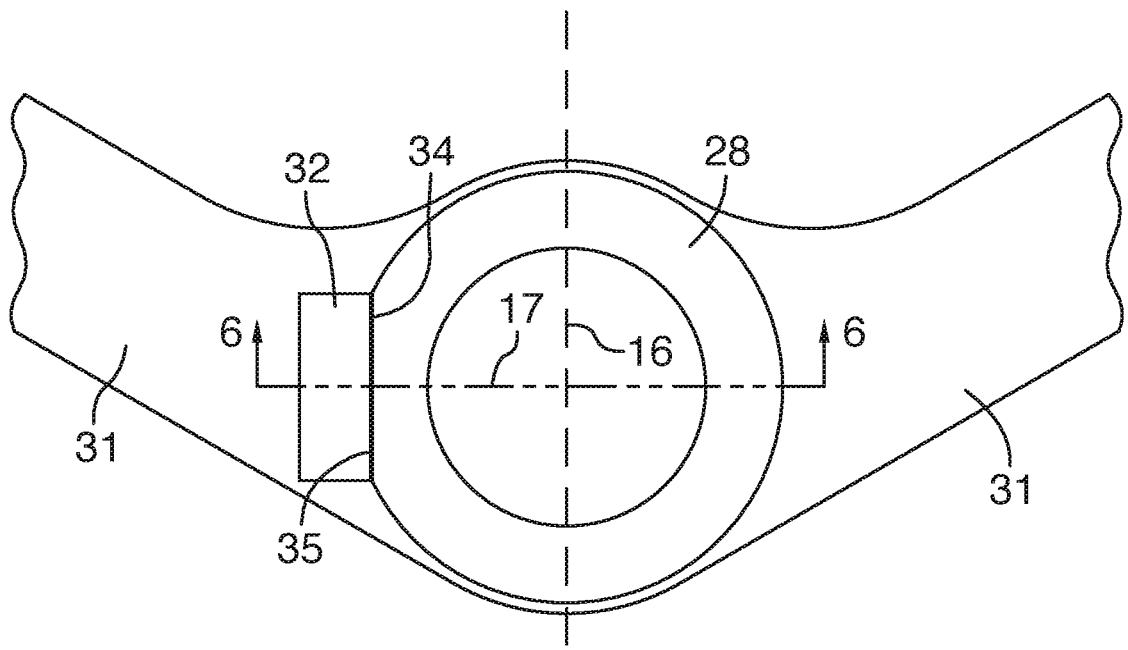
FIG. 5 is a top view of a housing mounted into an automotive component, the housing having a flat side recess and the automotive component having a matching protruding boss that serve as alignment guides for assembling the housing to the component with major and minor planes of the directional bearing aligned.
Figure 6:
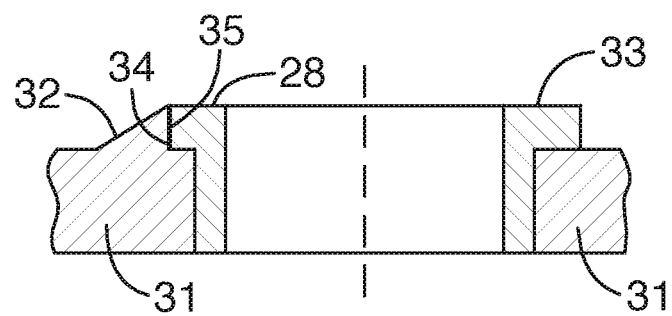
FIG. 6 is a sectional view along line 6-6 of FIG. 5.

FIGS. 5-6 show a means to align the housing 28 with an automotive component 31. By aligning the bearing 27 with the housing 28, and aligning the housing 28 with the automotive component 31, the final alignment of the major swing plane 16 and minor swing plane 17 in the completed ball joint-automotive component assembly is ensured. The automotive component 31 includes a protruding boss 32 adjacent the opening through which the ball joint housing 28 extends providing a third alignment guide. The housing 28 has a radially extending flange 33 having flat recessed edge 34 matching the flat edge 35 of the protrusion providing a fourth alignment guide. Alternatively the alignment guides could comprise a recess (not shown) adjacent the opening through which the ball joint housing 28 extends and the radially extending flange 33 of the housing 28 could include a protrusion (not shown) matching the recess.

Although the above description relates to a specific preferred embodiment as presently contemplated by the inventors, it will be understood that the invention in its broad aspect includes mechanical and functional equivalents of the elements described herein.

We claim:

1. A ball joint comprising:
   a housing having an internal chamber having a bearing seat with a first alignment guide and an open end, the housing and open end having a housing axis;
   a ball stud having a longitudinal stud axis, a spherical ball end within the housing and a shank extending axially out of the open end of the housing;

a directional bearing having an external surface engaging the bearing seat, the external surface having a second alignment guide mating with the first alignment guide, wherein the first alignment guide and the second alignment guide comprise elliptical mating surfaces mechanically interlocking with each other whereby relative rotation about the housing axis between the directional bearing and the housing is prevented, and the directional bearing having an internal spherical surface within which the ball end is pivotally mounted for angular motion of the longitudinal stud axis within a major swing plane through the housing axis in a range of ±angle α relative to the housing axis and a minor swing plane through the housing axis in a range of ±angle β relative to the housing axis, where α is greater than β, wherein an elliptical edge of the housing defines an opening of the open end, and wherein the range of ±angle α and the range of ±angle β is defined by the elliptical edge for allowing the ball stud to swing without interference to a greater degree along the major swing plane compared to the minor swing plane.

2. An automotive component having an opening through which a ball joint extends, the automotive component including a third alignment guide, the ball joint comprising:

a housing having a radially extending flange having a fourth alignment guide, an internal chamber having a bearing seat with a first alignment guide and an open end, the housing and open end having a housing axis;

a ball stud having a longitudinal stud axis, a spherical ball end within the housing and a shank extending axially out of the open end of the housing;

a directional bearing having an external surface engaging the bearing seat, the external surface having a second alignment guide mating with the first alignment guide, wherein the first alignment guide and the second alignment guide comprise elliptical mating surfaces mechanically interlocking with each other whereby relative rotation about the housing axis between the directional bearing and the housing is prevented, and the directional bearing having an internal spherical surface within which the ball end is pivotally mounted for angular motion of the longitudinal stud axis within a major swing plane through the housing axis in a range of ±angle α relative to the housing axis and a minor swing plane through the housing axis in a range of ±angle β relative to the housing axis, where α is greater than β, wherein an elliptical edge of the housing defines an opening of the open end, and wherein the ramie of ±angle α and the ramie of ±angle β is defined by the elliptical edge for allowing the ball stud to swing without interference to a greater degree along the major swing plane compared to the minor swing plane.

3. The automotive component according to claim 2 comprising a protrusion adjacent the opening of the automotive component through which the ball joint extends, wherein the radially extending flange of the housing includes a recess matching the protrusion.

\* \* \* \* \*